April 12, 1932. F. W. HORNBRUCH 1,853,863
GAS CONTROL VALVE OPERATED BY AIR PRESSURE
Filed April 9, 1927
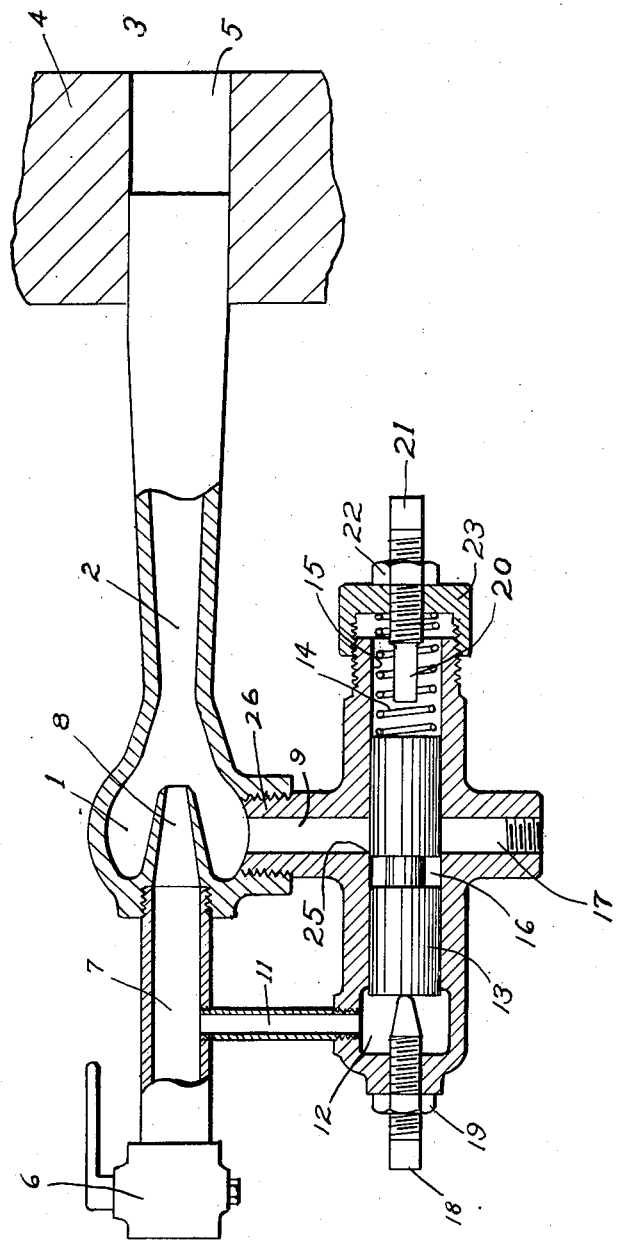

Patented Apr. 12, 1932                                                                                     1,853,863

UNITED STATES PATENT OFFICE

FREDERICK W. HORNBRUCH, OF ROSELLE PARK, NEW JERSEY, ASSIGNOR TO AMERICAN GAS FURNACE COMPANY, OF ELIZABETH, NEW JERSEY, A CORPORATION OF NEW JERSEY

GAS CONTROL VALVE OPERATED BY AIR PRESSURE

Application filed April 9, 1927. Serial No. 182,248.

This invention relates to an improved method of controlling the mixture of a fluid and more particularly a gas which is combustible with another which supports combustion such as air, oxygen &c. The principal object is to control the flow of gas one by the other, so that in case the flow or supply of one gas varies the other will be automatically controlled thereby in a more efficient and simpler way.

Another object is to inject a gas into a mixing chamber and producing the flow of another gas under constant pressure proportionate to the flow of the first gas substantially independent of the variation of resistance from the supply nozzle, mixing chamber or any of the other elements associated therewith. This resistance to flow may include any one of a number of different elements such as back pressure from the furnace or from the exhaust flue &c. The back pressure might be caused by unfavorable gusts of wind where the exhaust is into the open air, or explosions within the fire-box itself. Fluctuations in temperature within the fire-box and the consequent variations and contractions of the products of combustion, the withdrawal of materials being heated, opening or closing of the doors or dampers, and variations of pressure in the flue due to other causes, or by the variation in quality of gases may result in variations of pressure within the mixing chamber and within the fire-box.

Another object of this invention is to construct and arrange a device for regulating fuel control valves having a fewer number of moving parts than heretofore and of a simpler construction.

Another object of this invention is to provide a controlling arrangement for automatically adjusting the proportions of a mixture of combustible material in which no pliable membranes are necessary which are liable to rot and become leaky and is further so arranged as to obviate any difficulty on account of leakage past the piston which might permit of local detonations or explosions in case of back-firing.

A still further object of this invention is to provide an automatically controlled fuel valve for controlling the supply of fuel to a mixing chamber and thence to a fire-box. Between this mixing chamber and fire-box there is arranged a nozzle which has no unevennesses or holes or restrictions therein. The nozzle is in the form of a Venturi-tube connected with the mixing chamber and, as is well known, varies the pressure and speed of gases at different points. It is important that this Venturi tube be arranged for free and easy passage of the gases without restriction which might collect carbon or other deposits from the gases themselves. It is also desirable to have the inside surface of this tube as smooth as possible such as can be accomplished by machining and polishing.

It is another object of this invention to provide a mixing chamber with controlling ducts leading therefrom arranged as close as possible to the mixing chamber so that the best efficiency results therefrom and the least likelihood of fluttering or oscillation arises. The use of a piston in such an arrangement is more advantageous inasmuch as it provides means for the application of friction directly to the pressure-operated member to prevent such fluttering.

Another object of this invention is to provide a fuel control valve with adjustments for controlling the cut-off pressure of the combustion supporting gas at which the valve will operate, an adjustment for proportioning the fuel gas to combustion supporting gas, and a still further adjustment for controlling the maximum possible flow of fuel and also concurrent adjustment of the proportioning means and the maximum flow adjustment means in order to simplify the control therefor.

Further and more definite objects will appear in connection with the following specification, claims and drawing in which the single figure represents a form of my arrangement.

In this figure, 1 indicates a mixing chamber in the form of a Venturi tube connected to a nozzle 2. This nozzle projects into a fire box 3 represented by the refractory wall 4 with a hole 5 extending therethrough for supporting the nozzle.

6 is a control valve for normally controlling the flow of combustion supporting gas at comparatively high pressure through the tube and the jet 8 projecting into the mixing chamber 1. This gas pressure is subject to some variations. Another tube 9 opens into this chamber for conducting combustible gas or fluid therein.

A duct 11 opens into the tube 7 flush and at right angles with the inner surface for obtaining a true static pressure of the gas with the tube 7 without being affected by the flow of fluid therethrough. This duct opens into the chamber 12 at the end of a piston 13 resiliently pressed to the left by spring biasing means 14 located in the cylinder 15. A by-pass or reduced portion 16 is provided on the piston which when properly located with respect to the tube 9 and a source of low-pressure combustible gas supply 17 permits the flow of gas through the tubes and into the mixing chamber.

The piston 13 is held in extreme left position by adjustable stop 18 which may be retained in adjusted position by lock-nut 19. An abutment 20 on the end of screw 21 prevents the pressure of the gas in chamber 12 from throwing the piston 13 too far to the right. This screw is locked in position by nut 22 and is mounted in the nut or cap 23 adjustably arranged on the walls of the cylinder 15 so as to adjust the tension of spring 14 therethrough. With the adjustment of the cap 23 a simultaneous adjustment of abutment 20 takes place which may be advantageous for some purposes when low proportions of combustible gas are desired.

It is obvious that any high pressure fluid or gas from duct 11 which may escape between the piston 13 and the walls of the cylinder will be conducted through the tube 9 and into the mixing chamber 1.

The supply of gas at 17 is under a slight pressure so that it will pass through the pipe in the ordinary way. This pressure only amounts to 2 or 3 ounces over the ordinary atmospheric pressure, such as exists in the ordinary gas main.

It has also been found to be advantageous to use the piston 13 inasmuch as the friction between it and the walls of the cylinder prevent rapid fluctuation or fluttering of the combustible gas control valve. Such fluttering, as is obvious, would be very undesirable.

If desired the adjusting screw 18 may be so set as to provide a slight opening at 25 when the piston 13 is in the extreme position to the left. This may be advantageous at times when it is desired that there be provided a small pilot flame in the fire-box even though the supply of gas which supports combustion is interrupted. Such an arrangement would be advantageous in preventing explosions due to the accumulation of combustible gas in the fire-box whenever the supply of combustion supporting gas were cut off so as to cause the flame to become extinguished. If the supply of combustion supporting gas were later turned on then a large amount of combustible and explosive mixture might be withheld in the fire-box and if an attempt were made to ignite it an explosion would follow with disastrous results.

With the present arrangement it is possible to maintain complete control of the flame by means of the valve 6 and with no further or additional adjustments. Once the adjustments 18, 21 and 23 are set for a certain grade or type of combustible gas then it is possible to control the apparatus automatically by the valve 6.

In the present arrangement the control apparatus is maintained in as close relation to the mixing nozzle 1 as is possible and no tubes or ducts are led from this flame supporting Venturi tube 1 so as to form an obstruction or unevenness where carbon deposits may accumulate and thereby interfere with the operation of the apparatus. Often times when such carbon deposits accumulate they may become accidentally ignited and thereby cause what is known as a flare-back to ignite all of the gases within the mixing chamber 1 and the Venturi tube 2.

This is undesirable inasmuch as it is likely to be maintained for some considerable time and cause damage to the structure due to heat or increased pressure. The inside of the Venturi tube 2 may be machined or polished as desired so as to overcome any difficulties arising from adherence of carbon deposits.

It can also be seen that the automatic control arrangement can be readily applied to existing gas burners which have a Venturi tube 2 and a mixing chamber 1. The control apparatus may be screwed into the mixing chamber 1 as is shown at 26 and the supply of gas conducted into the opening 17. Also the fact that a single piston 13 is the only movable part which is subject to wear and the fact that it can be readily withdrawn at the end of a bore 15 adds to the simplicity and efficiency of the arrangement.

It is not intended to be limited to the exact structure described and shown, but a full range of equivalents is desirable in the interpretation of the following claims and the structure shown is one of the preferable designs.

What I claim is:

1. A self-governing burner for air and fuel gas, including a delivery nozzle for burning the mixed air and gas, a compressed air-conduit provided with a jet directed toward said nozzle, a mixing chamber through which the stream from said jet is directed, the stream of compressed air tending to exhaust the mixing chamber, a conduit for fuel gas under low pressure leading to said mixing chamber, fuel gas being carried into said delivery nozzle by said stream of compressed air, and means dependent upon the effective pressure of the compressed air in said air-conduit, for regulating the volume of fuel gas supplied to said mixing chamber, said regulating means including a fuel-supply valve adjustable in one direction by the pressure of the compressed air, a spring tending to adjust the valve in the opposite direction, said valve interposed in the conduit for fuel gas, and having a transverse fuel-supply passage the extent of whose opening depends upon the position to which the valve is automatically adjusted, a valve-housing having a supply port with which said passage may register, and a manually operable valve to control the entire supply of compressed air to the burner, all of the air flowing through said manual valve passing also through said jet.

2. A self-governing burner for air and fuel gas, including a delivery nozzle for burning the mixed air and gas, a compressed-air conduit provided with a jet directed toward said nozzle, a mixing chamber through which the stream from said jet is directed, the stream of compressed air tending to exhaust the mixing chamber, a conduit for fuel gas under low pressure leading to said mixing chamber, fuel gas being carried into said delivery nozzle by said stream of compressed air, and means dependent upon the effective pressure of the compressed air in said air-conduit, for regulating the volume of fuel gas supplied to said mixing chamber, said regulating means including a fuel-supply valve adjustable in one direction by the pressure of the compressed air, a spring tending to adjust the valve in the opposite direction, said valve interposed in the supply of fuel gas, and having a transverse fuel-supply passage the extent of whose opening depends upon the position to which the valve is automatically adjusted, a valve-housing having a supply port with which said passage may register, said valve being in the form of an endwise moving cylinder, said housing fitting thereto, and said passage being in the form of a circumferential groove in said cylinder, and a manually operable valve to control the entire supply of compressed air to the burner, all of the air flowing through said manual valve passing also through said jet.

3. A self-governing burner for fuel gas and air, including a low pressure gas valve having a housing and a valve piston with a by-pass thereon, a conduit for compressed air communicating with said housing for actuating said piston acting on one end and a spring acting on the other end, fuel ports in said housing located adjacent the by-pass on said piston, and an adjusting device for controlling the normal position taken by said piston when no pressure is applied, extending externally of said housing at one end.

4. A self-governing gas-burner including a low pressure combustible gas valve having a housing and a valve piston with a by-pass portion thereon, a conduit for high pressure air communicating with said housing for actuating said piston acting on one end and resilient means acting on the other end, an entrance tube and an exit tube located adjacent the by-pass on said piston, and an adjusting device for controlling the position of said piston when fully actuated against the pressure of said resilient means, the latter extending externally of said housing at one end.

5. A self-governing gas-burner including a low pressure combustible gas valve having a housing and a valve piston with a by-pass portion therefor, a conduit for high pressure air communicating with said housing for actuating said piston acting on one end and a spring acting on the other end, an entrance tube and an exit tube located adjacent the by-pass on said piston, an adjusting device for controlling the tension of the spring, the latter extending exteriorly from one end of said housing, and an adjustable stop for preventing the piston from being retracted against the action of the spring to such an extent as to obstruct the flow of low pressure gas, said last adjustable means being mounted in said tension control means so as to be operated independently of or concurrently therewith.

6. A self-governing gas-burner including a low pressure combustible gas valve having a housing and a valve-piston with a by-pass portion therefor, a conduit for high pressure air communicating with said housing for actuating said piston acting on one end and a spring acting on the other end, an entrance tube for low pressure gas and an exit tube located adjacent the by-pass on said piston, an adjusting device for controlling the tension of said spring, the latter extending exteriorly from one end of said housing, an adjustable stop for preventing the piston from being retracted against the action of the spring to such an extent as to obstruct the flow of low pressure gas, said last adjustable means being mounted in said tension control means so as to be operated independently of or concurrently therewith, and another adjusting device for controlling the normal position taken by said piston when no pressure is applied extending externally of said housing through the other end.

7. A proportional self-regulating gas-burning device including a delivery tube, an injector therefor connected through a tube to a conduit for high pressure air, a duct connecting said tube with a housing in which is positioned a valve, one end of which is resiliently pressed by a spring, a combustible gas passage in said valve arranged near said injector, said gas passage being adapted to regulate the flow of gas therethrough, and a proportion-regulating adjustable cap on one end of said housing for adjusting the tension of the spring, and thereby regulating the proportions of gases in the delivered mixture, and a manually operable valve to control the entire supply of compressed air to the burner, all of the air flowing through said manual valve passing also through said injector.

8. A proportional self-regulating gas-burning device including an injector connected through a tube to a conduit for high pressure air, a duct having a point of entry which is flush with the side walls of said tube, said duct leading from said tube to a chamber formed in a housing in which is slidably positioned a piston, one end of which is resiliently pressed by a spring, a by-pass on said piston arranged near openings to a low pressure conduit for combustible gas in a conducting tube, said by-pass being adapted to coact with said openings to control the flow of gas therethrough, an adjustable cap on one end of said housing for adjusting the tension of the spring, and an adjustable stop in said cap for preventing the movement of said piston beyond a definite point in said housing.

9. A proportional self-regulating gas-burning device including an injector connected through a tube to a conduit for high pressure air, a duct having a point of entry which is flush with the side walls of said tube, said duct leading from said tube to a chamber formed in a housing in which is slidably positioned a piston, one end of which is resiliently pressed by a spring, a by-pass on said piston arranged near openings to a low pressure conduit for combustible gas in a conducting tube, said by-pass being adapted to coact with said openings to control the flow of gas therethrough, an adjustable cap on one end of said housing for adjusting the tension of the spring, an adjustable stop in said cap for preventing the movement of said piston beyond a definite point in said housing, and other adjustable means for limiting the movement of the piston in an opposite direction.

10. A proportional self-regulating gas-burning device including an injector connected through a tube to a conduit for high pressure air, a duct having a point of entry which is flush with the side walls of said tube, said duct leading from said tube to a chamber formed in a housing in which is slidably positioned a piston, one end of which is resiliently pressed by a spring, a by-pass on said piston, arranged near openings to a low pressure conduit for combustible gas, said by-pass being adapted to coact with said openings to control the flow of gas therethrough, an adjustable cap on one end of said housing for adjusting the tension of the spring, and an adjustable stop in said cap for preventing the movement of said piston beyond a definite point in said housing, the removal of said cap also serving as a means for removing or replacing said piston.

11. A proportional self-regulating gas-burning device including an injector connected through a tube to a conduit for high pressure air, a duct having a point of entry which is flush with the side walls of said tube, said duct leading from said tube to a chamber in which is slidably positioned a piston, one end of which is resiliently pressed by a spring, a by-pass on said piston arranged near openings to a low pressure conduit for combustible gas, said by-pass being adapted to coact with said openings to control the flow of gas therethrough, an adjustable cap on one end of said chamber for adjusting the tension of the spring, an adjustable stop in said cap for preventing the movement of said piston beyond a definite point in said chamber, and other adjustable means for limiting the movement of the piston in an opposite direction, the removal of said cap also serving as a means for removing or replacing said piston.

12. A burner for mixed air and fuel-gas including a mixing chamber, a discharge-nozzle having the form of a Venturi tube leading from said chamber, a compressed air conduit provided with a jet extending into said chamber and directed into said Venturi tube, a conduit for fuel-gas under low pressure terminating in a passage leading into said mixing chamber transversely of said Venturi tube, said jet projecting into said chamber beyond said fuel passage so that the stream of compressed air tends to exhaust the mixing chamber and draw fuel-gas thereinto and expel the mixed air and gas therefrom, a fuel-supply valve for closing and opening said fuel passage, a housing in which said valve is mounted, said housing being at one end in communication with said air conduit to enable the valve to be operated by the pressure of the air, said valve having a gas passage and being movable from closed position to open position, a spring tending to close the valve, a stop against which the valve may be pressed by said spring, a stop for the opposite side of the valve, and adjustable means for varying the pressure of the spring upon said valve to regulate the proportions of the mixed air and gas delivered.

13. A burner for mixed air and fuel-gas including a mixing chamber, a discharge-nozzle having the form of a Venturi tube leading from said chamber, a compressed air conduit provided with a jet extending into said chamber and directed into said Venturi tube, a conduit for fuel-gas under low pressure terminating in a passage leading into said mixing chamber transversely of said Venturi tube, said jet projecting into said chamber beyond said fuel passage so that the stream of compressed air tends to exhaust the mixing chamber and draw fuel-gas thereinto and expel the mixed air and gas therefrom, a fuel-supply valve for closing and opening said fuel passage, a housing in which said valve is mounted, said housing being at one end in communication with said air supply to enable the valve to be operated by the pressure of the air, said valve having a gas passage and being movable from closed position to open position, a spring tending to close the valve, a stop against which the valve may be pressed by said spring, and a stop for the opposite side of the valve, said spring bearing against an adjustable cap upon said housing, and said stops being adjustable independently of said cap.

14. A burner for mixed air and gas, said burner having a mixing chamber provided with a discharge, a compressed air conduit provided with a jet extending into said chamber, a conduit for fuel-gas under low pressure terminating in a passage leading into said mixing chamber, the stream of compressed air tending to exhaust the mixing chamber and draw fuel-gas thereinto and emit mixed air and gas therefrom, a fuel-supply valve in the form of a piston for closing and opening said fuel passage, said piston extending transversely of said passage, a housing in which said piston is mounted, said housing being at one end in communication with said air supply to enable the piston to be adjusted by the pressure of the air, said piston having a gas passage and movable from a closed position to a position for opening said gas-supply passage, a spring tending to close the gas-supply passage, an adjustable stop for the piston, and adjustable means for varying the pressure of the spring upon said piston to regulate the proportions of the mixed air and gas delivered from said mixing chamber.

15. A burner for mixed air and gas, said burner having a mixing chamber provided with a discharge, a compressed air conduit provided with a jet extending into said chamber, a conduit for fuel-gas under low pressure terminating in a passage leading into said mixing chamber, the stream of compressed air tending to exhaust the mixing chamber and draw fuel-gas thereinto and emit mixed air and gas therefrom, a fuel-supply valve in the form of a piston for closing and opening said fuel passage, said piston extending transversely of said passage, a housing in which said piston is mounted, said housing being at one end in communication with said air supply to enable the piston to be adjusted by the pressure of the air, said piston having a gas passage and movable from a closed position to a position for opening said gas-supply passage, a spring tending to close the gas-supply passage, an adjustable stop for the piston, an adjustable cap upon said housing, and means adjustable independently of said cap for arresting said piston when moved by said spring.

16. A burner for mixed air and fuel-gas including a mixing chamber, a discharge-nozzle having the form of a Venturi tube leading from said chamber, a jet extending into said chamber and directed into said Venturi tube, a compressed air supply pipe threaded into said jet and having a control valve, a fitting for supplying fuel-gas under low pressure, said fitting threaded into said mixing chamber and terminating in a passage leading into said mixing chamber transversely of said Venturi tube, said jet projecting into said chamber beyond said fuel passage, so that the stream of compressed air tends to exhaust the mixing chamber and a draw fuel-gas thereinto and emit the mixed air and gas therefrom, a transverse piston for closing and opening said fuel passage, said fitting including a housing in which said piston is mounted, means leading from said air supply to said housing at one end to enable the piston to be operated by the pressure of the air, said piston having a gas passage which is movable from closing to opening position, a spring tending to move the piston to close the gas-supply passage, adjustable means for varying the pressure of the spring upon said piston, to regulate the proportions of the mixed air and gas delivered, and an adjustable stop against which the piston may be pressed by said spring.

17. A burner for mixed air and fuel-gas including a mixing chamber, a discharge-nozzle having the form of a Venturi tube leading from said chamber, a jet extending into said chamber and directed into said Venturi tube, a compressed air supply pipe threaded into said jet and having a control valve, a fitting for supplying fuel-gas under low pressure, said fitting threaded into said mixing chamber and terminating in a passage leading into said mixing chamber transversely of said Venturi tube, said jet projecting into said chamber beyond said fuel passage, so that the stream of compressed air tends to exhaust the mixing chamber and draw fuel-gas thereinto and emit the mixed air and gas therefrom, a transverse piston for closing and opening said fuel passage, said fitting including a housing in which said piston is mounted, means leading from said air supply to said housing at one end to enable the piston to be operated by the pressure of the air, said piston having a gas passage which is movable from closing to opening position, a spring tending to move the piston to close the gas-supply passage, an adjustable cap upon said housing against which the spring bears, and means adjustable independently of said cap for arresting said piston.

18. A burner for mixed air and fuel-gas including a mixing chamber, a discharge-nozzle having the form of a Venturi tube extending from said chamber, a compressed air-supply pipe having an adjustable valve for controlling the air, said pipe secured to said mixing chamber, a jet formed in said chamber and directed into said Venturi tube in line with said pipe, a fitting attached to said mixing chamber, a conduit for fuel-gas under low pressure terminating in said fitting and having a passage leading into said mixing chamber transversely of said Venturi tube, said jet projecting into said chamber beyond said fuel passage so that the stream of compressed air from said jet tends to exhaust the mixing chamber and to draw fuel-gas thereinto and to expel mixed air and gas therefrom, a fuel-supply valve in said fitting and having the form of a piston for closing and opening said fuel passage, said piston extending transversely of said passage, said fitting being in the form of a housing in which said piston is mounted, said housing at one end having communication with said air-supply pipe to enable the piston to be operated in one direction by the pressure of the air, said piston provided with a transverse gas passage and movable from a closing position to a position for opening said gas-supply passage, a spring in said fitting acting upon said piston and tending to move it to close the gas-supply passage, and adjustable means for varying the pressure of the spring upon said piston, and thereby regulate the proportions of the mixed air and gas delivered by said burner.

19. A gas burner having a conduit for high pressure air, a conduit for low pressure combustible gas, a jet for the high pressure air, a Venturi tube into which the high pressure air is discharged by said jet, a mixing chamber connected by a passage to a source of low pressure gas, and also opening into the Venturi tube through which the jet is directed, a valve controlled by the high pressure air consisting of a slidable piston in a housing for restricting the passage of gas at low pressure into the chamber, a conduit from said housing to the high pressure air conduit, the piston being operable by the air pressure, a spring for returning said piston, whereby any leakage of high pressure air about the piston will escape through the low pressure gas passage into the mixing chamber, and a manually operable valve to control the entire supply of high pressure air to the burner, all of the air flowing through said manual valve passing also through said Venturi tube.

20. In a gas-burner, a burner-tube, an injector therefor supplied through a conduit by air at high pressure, a conduit for combustible gas at low pressure, the combustible gas being drawn by the high pressure air into the injector, a control valve for the low pressure gas having a housing and piston so arranged as to govern the flow of low pressure gas through the action of biasing means acting on one end of the piston when the high pressure is varied, a conduit from said housing to said high pressure conduit, said piston being acted on at the other end by the high pressure air and acting to interrupt the supply of low pressure gas by means of a by-pass located between the ends comprising a reduced portion in said piston, whereby leakage of the low pressure gas past the piston will be prevented by the pressure produced by the high pressure air, and a manually operable valve to control the entire supply of compressed air to the burner, all of the air flowing through said manual valve passing also through said injector.

In testimony whereof I have signed this specification this seventh day of April 1927.

FREDERICK W. HORNBRUCH.